Figure 1:
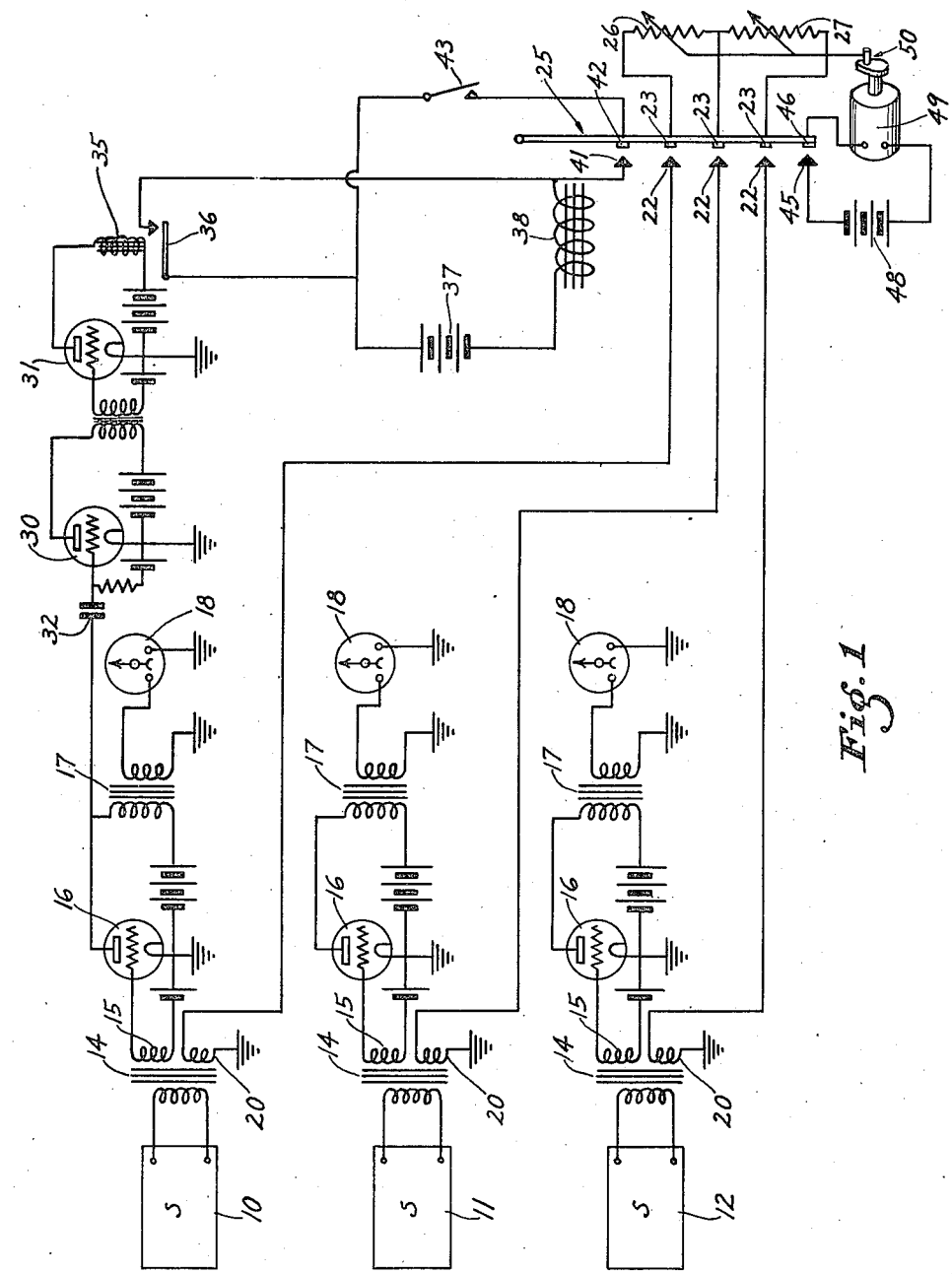

May 9, 1944. J. O. PARR, JR 2,348,409
SEISMIC SURVEYING
Filed June 14, 1941 2 Sheets-Sheet 2

Inventor
J. O. Parr, Jr.
By Watson, Cole, Grindle & Watson
Attorneys

Patented May 9, 1944

2,348,409

UNITED STATES PATENT OFFICE 2,348,409

SEISMIC SURVEYING

Josephus O. Parr, Jr., San Antonio, Tex., assignor to Olive S. Petty, San Antonio, Tex.

Application June 14, 1941, Serial No. 398,166

9 Claims. (Cl. 177—352)

This invention relates to seismic apparatus and methods such as may be employed in geological surveying. It is the principal object of the invention to improve and simplify the equipment commonly used for this purpose and to alter the method of use thereof so as to effect a record of seismic impulses which may be more readily interpreted.

Reasonably accurate mapping of geological formations can be effected by creating seismic waves at a point or points near the earth's surface and determining at one or more points remote therefrom the lapse of time required to enable the waves to reach such remote points. The customary procedure in such surveying is to fire a charge of explosive on or at a suitable distance below the surface of the earth at a position commonly referred to as a "shot point," and to detect or receive the resulting direct, reflected, and refracted seismic waves at remote points where they are converted into electrical energy of varying voltage. Suitable apparatus is then employed to record the fluctuations of this electrical energy in permanent form for study.

Conventional equipment for receiving and recording the seismic waves includes at the receiving point a device variously called detector, seismograph, seismometer, geophone, or the like. Such an instrument may take as many forms as it has names, and in general comprises a relatively steady mass and a part movable with the earth, these parts supporting electrical elements relatively movable thereby, whereby electric voltages are generated or varied in accordance with variation in the strengths of the respective energizing waves. The electrical output from such a seismometer is customarily amplified with suitable equipment and fed into a recorder which includes a galvanometer having a moving element whose motion, by suitable optical means, is recorded on a photographic sheet caused to move by clockwork at a substantially fixed rate and also to have recorded thereon definite time intervals from an appropriate timer.

It is customary to employ a number of seismometers which are arranged in spaced relation. The signal energy from each seismometer is separately amplified and recorded, so that the record sheet bears a number of traces, each trace being representative of the seismic impulses arriving at one of the seismometers. However, it is sometimes found advantageous to combine to a controlled extent the signal energy from two or more seismometers in order to reduce the magnitude of the energy derived from waves propagated generally horizontally, and therefore less significant in determining the depth of underlying strata.

For example, if two seismometers are spaced, as measured in the direction of propagation of such waves, by one-half of the wave length thereof, the combined energy output of the two seismometers will be 180° out of phase and will substantially cancel. Such spacing will not materially affect, however, the energy derived from waves which penetrate to a considerable depth and are reflected and/or refracted upwardly, since such waves ordinarily approach the surface in a more nearly vertical direction. In other words, by employing a plurality of seismometers and spacing them in the direction of propagation of the waves which travel in the upper crust, so that their combined energy output will approach zero, the energy derived from such waves is thereby considerably reduced in magnitude with respect to the energy derived from waves reflected and refracted from considerable depths.

Combining or compositing of energy from several seismometers also reduces materially the response to random energy, and for this purpose the seismometers need not be spaced in the direction of propagation of the generally horizontal waves. Thus, it is highly unlikely in a system employing a number of seismometers that random energy will be received at the several seismometers in phase, regardless of the arrangement of the seismometers with respect to each other or with respect to the source of seismic impulses. Actually, random energy may affect one only of a group of seismometers, no appreciable response being received at other seismometers of the group, in which event the effect of the random energy will be negligible if the signals from two or more seismometers are composited or partly combined.

These and other methods of seismic surveying, depending upon mixing or compositing of the signals received at a number of spaced seismometers, while frequently beneficial, are open to the objection that the time of arrival of those waves which travel by the shortest path and which are of considerable value in the calculation of weathering corrections and near-surface velocities, are thereby partly or entirely obscured. Thus these waves, which are ordinarily propagated in a generally horizontal direction, as distinguished from the waves reflected from deeper strata, tend to cancel out or are minimized, and this has been found undesirable.

It is therefore proposed, as part of the invention, to effect mixing or compositing of signals derived from several seismometers only after the reception of the earlier arriving impulses, in order that the times of arrival of such impulses may be accurately computed.

More specifically, it is an object of the invention to provide means whereby signals from different seismometers are recorded separately until the earlier arriving impulses reach that seismometer of a series which is at the greatest distance from the shot point, whereupon mixing of signals from the several seismometers, in the manner and to the extent desired, is automatically initiated.

It will also be appreciated that in general the reflections from deeper beds will arrive more nearly in phase at the several seismometers than will the reflections from shallower beds. It is therefore proposed, as a further feature of the invention, to effect a gradual increase with time of the extent of mixing or compositing of the signals, whereby the later arriving and feebler impulses will be adequately reinforced on the record.

In accordance with a further feature of the invention, it is proposed to vary the combinations of signals with time in the interest of clarification of the record. For example, near the beginning of the record when the reflected waves are substantially in phase only at adjacent seismometers, the signals from such adjacent seismometers only will be composited. As the signals are reflected from greater depths, and therefore arrive more nearly in phase at seismometers which are not necessarily adjacent, compositing occurs between larger groups of seismometers.

Preferably these changes in the manner and extent of mixing or compositing are effected automatically, and it is an object of the invention to provide means, the operation of which is initiated in response to the arrival of earlier energy, for automatically effecting the desired alteration in recording of the signal energy.

Figure 2:
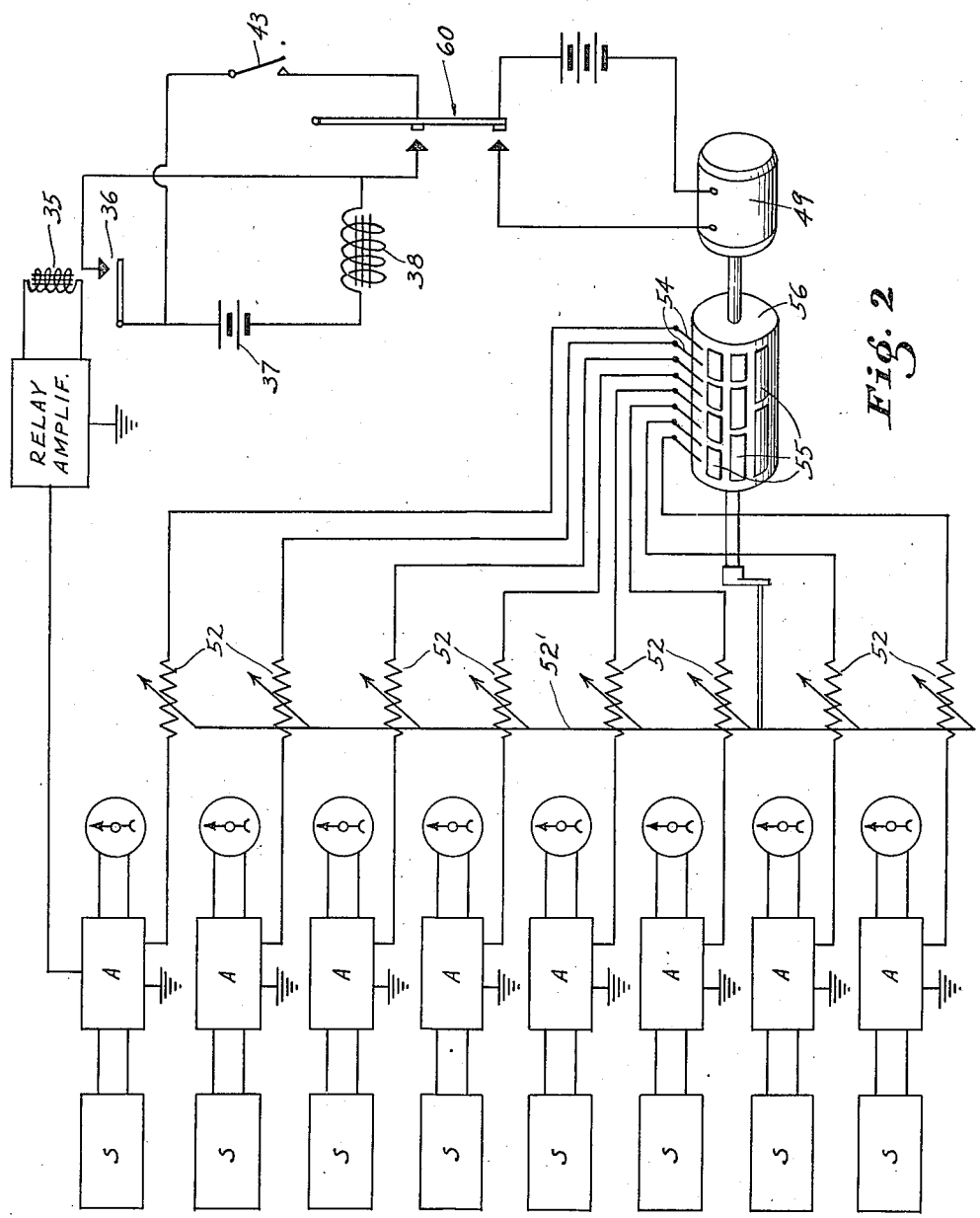

Further objects and features of the invention will be apparent from the following description, taken in connection with the accompanying drawings, in which:

Figure 1 is a wiring diagram illustrative of one method of practicing the invention; and Figure 2 is a diagram illustrating a further modification.

In order to facilitate an understanding of the invention, reference is made herein to the embodiment thereof illustrated in the drawings and specific language is employed to describe the same. It will nevertheless be understood that no limitation of the invention is thereby intended, and that various other modifications and alterations of the illustrated and described arrangements are contemplated such as embody the principles of the invention and fall within the scope of the claims appended hereto.

For convenience in illustrating the invention, Figure 1 discloses only three seismometers, indicated at 10, 11, and 12, but it will be appreciated that in practice a larger number, for example eight or nine, will usually be found more effective. The output of each of the seismometers may be delivered to a transformer 14, the secondary windings 15 of which deliver energy to suitable amplifying circuits including thermionic valves 16 and output transformers 17, the latter supplying the energy to indicating or recording devices 18, which may be constructed as briefly described hereinbefore.

It will be appreciated that the arrangement just described is wholly illustrative and that the details thereof form no part of the instant invention. The seismometers, amplifiers, and recorders herein shown may be constructed and operated in any conventional manner.

In order that the signals may be mixed, composited, or combined, a determined portion of the signal energy from each seismometer is fed to the circuit for amplifying and recording the signal energy from another seismometer or seismometers. For example, each of the transformers 14 may be provided with an auxiliary secondary winding 20, the signal energy from each of these windings being delivered to one of a plurality of contact points 22 of a relay switch indicated generally at 25. The cooperating movable contact points 23 of the switch are so connected to a pair of variable resistors 26 and 27 that on the closing of the switch, the secondary windings 20 associated with the seismometers 10 and 11 are coupled through the resistor 26 while the windings 20 associated with the seismometers 11 and 12 are coupled through the resistor 27. By means of this arrangement, there is effected an interchange of energy between the several seismometers to an extent and in a manner determined by the setting of the variable resistors 26 and 27, whereby the signals are combined or composited. Thus in the arrangement shown, a mixture of the signal energy from seismometers 10 and 11 will predominate in the record produced by one unit 18, composite energy from the seismometers 10, 11 and 12 will predominate in the record of the second recording unit 18, while in the record of the third recording unit 18 the composite energy from seismometers 11 and 12 will predominate. It will be appreciated that these results may be varied by adjustment of the resistors 26 and 27 and that as larger numbers of seismometers are employed, the nature of the mixing becomes increasingly complicated.

As has been indicated, it is proposed to delay the mixing of signal energy until the seismic impulses which travel through the shortest time path have reached the several seismometers, in order that the time of arrival of these impulses may be accurately determined. In order that this result may be achieved, there may be provided an amplifier comprising thermionic valves 30 and 31, valve 30 being supplied through a condenser 32 with energy from the anode circuit of valve 16 of that seismometer 10 which is farthest from the shot point. The output of valve 31 is supplied to a winding 35 which controls a switch 36, the latter being arranged in a circuit which includes a voltage source 37 and a winding 38, the latter being arranged, when energized, to close the relay switch 25. Voltage source 37 and winding 38 are also arranged in a circuit which includes contact points 41 and 42, the latter being mounted on the movable element of the relay switch 25, and a manually operable switch 43.

It will be observed that when the switch 43 is closed, energization of the winding 35 on arrival of signal energy from the seismometer 10 will close the switch 36 and thereby energize the winding 38 to close its relay switch 25, whereby mixing of signals is initiated. The simultaneous closing through contact point 41 of the separate circuit which includes the switch 43 ensures continued energization of the winding 38, regardless of interruption in the flow of energy from the seismometer 10, so that the mixing continues during the further recording of the impulses propagated by the explosion. Before a further shot is fired, switch 43 is opened to release the relay switch 25, and is again closed so that the operation may be repeated.

If it is desired to vary the extent of mixing during the taking of a record, for the purpose hereinbefore indicated, I may provide contact elements 45 and 46 which are engaged on operation of the relay switch 25 to close a circuit which includes a source of voltage 48 and a motor 49, the latter having associated therewith suitable reduction gearing for driving operating means, illustrated conveniently at 50, and connected to vary the resistors 26 and 27. Thus the value of these resistors may be reduced with lapse of time in the taking of the record so that the extent to which the signals are mixed is gradually increased, the principal purpose being the mixing to a greater extent of signals representing seismic reflections from greater depths.

It is of course feasible to alter the relative variation of different resistors, such as 26 and 27, in a given period of time, and to this end the several resistors may be separately driven to afford any desired variation in the mixing effect. Furthermore, I find that under some conditions it is desirable to alter the manner as well as the extent of mixing during the course of taking a record.

For example, I may employ an arrangement such as is diagrammatically illustrated in Figure 2 by means of which the grouping of the seismometers for mixing may vary with time. Thus this figure shows diagrammatically a plurality of seismometers S, the energy from each seismometer being delivered to an amplifier A and thence to a suitable recorder. As in the previously described arrangement, a portion of the energy from each seismometer is separated for delivery to and mixing with the energy in other amplifiers of the system, variable resistors 52, which may be controlled with time as in the previous embodiment, being employed to apportion the interchange of signal energy. For this purpose a rod 52' may gang the resistor controls and be driven from an extension shaft by motor 49 as shown. The energy for mixing from each amplifier may be delivered to one of a plurality of contact elements 54 which are arranged to be bridged by conducting segments 55 on a drum 56, the latter being driven through suitable reduction gearing from a motor 49 which is controlled in the manner indicated in the previous embodiment of the invention by means of a relay switch 60, other elements of the relay circuit being similar to those previously described and being similarly numbered.

The segments 55 on the drum 56 may be arranged so as to select and to vary with time the grouping of seismometers for interchange and compositing of energy. For example, when the relay switch 60 is first operated to start the motor 49 on the arrival of a signal at that seismometer which is farthest from the shot point, the combining of signal energy from adjacent seismometers only may be initiated. As the drum continues to rotate, the number of seismometers grouped for compositing of energy may be increased to three and thereafter to four. In this manner it is possible to take advantage of the fact that the later arriving seismic waves, reflected from greater depths, are more nearly in phase at the several seismometers, so that the signals representative thereof may be materially strengthened by combination to compensate for the gradual weakening of the seismic impulses with lapse of time.

It is obvious that by proper setting of the drum 56 prior to operation, signal combination need not begin until the first group of segments are engaged by the contact elements 54, so that combination is thus initiated following the arrival of seismic energy at the selected, and preferably the farthest, seismometer. Alternatively, the resistors 52 may comprise rheostats having an off or open position, mixing being initiated following the starting of the motor or other means which adjusts these resistors. A similar arrangement can be employed in connection with the form of the invention shown in Figure 1, with resultant elimination of certain contacts associated with the relay 25, both the initiation and the variation of the extent of mixing being effected by operation of the resistors 26 and 27.

It will be appreciated that the arrangement shown in Figure 2 is similarly only illustrative, and that in its broader aspects the invention contemplates the automatic control, with passage of time, of either the extent of compositing, the manner of compositing, or both, and that the desired result may be achieved by the use of retarded relays, timing devices, and various other instrumentalities falling within the province of one skilled in the art to construct and operate.

It will be understood that the term "seismometer" as employed herein refers either to a single unit for converting mechanical to electrical energy or to a group of such units so connected as to constitute in effect a single source of electrical energy.

Having thus described the invention, what is claimed as new and desired to be secured by Letters Patent is:

1. In apparatus for use in seismic surveying, the combination with a plurality of seismometers, of separate amplifying and recording devices associated therewith for separately recording energy representative of earlier arriving seismic waves, means for combining the signal energy from at least two of said seismometers and for delivering the combined energy to one of said recording devices, means operable on the arrival of seismic energy at that seismometer which is more remote from the source of the seismic disturbance for initiating operation of said first named means and for thereafter varying with time the extent to which such energy is combined by said first named means.

2. In apparatus for use in seismic surveying, the combination with a plurality of seismometers, of separate amplifying and recording devices associated therewith for separately recording energy representative of earlier arriving seismic waves, means for combining to a controlled extent the signal energy from at least two of said seismometers and for delivering the combined energy to one of said recording devices, means operable on the arrival of seismic energy at that seismometer which is more remote from the source of the seismic disturbance for initiating operation of said first named means, and a timing device rendered operable by said last named means for varying with time the amount of signal energy thus combined.

3. In apparatus for use in seismic surveying, the combination with a plurality of seismometers, of separate amplifying and recording devices associated therewith for separately recording energy representative of earlier arriving seismic waves, means for combining to a controlled extent the signal energy from at least two of said seismometers as selected from the group and for delivering the combined energy to one of said recording devices, and means for selectively varying with time the grouping of the seismometers for signal combination.

4. In apparatus for use in seismic surveying, the combination with a plurality of seismometers, of separate amplifying and recording devices associated therewith for separately recording energy representative of earlier arriving seismic waves, means for combining to a controlled extent the signal energy from at least two of said seismometers as selected from the group and for delivering the combined energy to one of said recording devices, means for selectively varying with time the grouping of the seismometers for signal combination, and means operable in response to signal energy from that seismometer which is more remote from the seismic disturbance for initiating operation of said last named means.

5. In apparatus for use in seismic surveying, the combination with a plurality of seismometers, of separate amplifying and recording devices associated therewith for separately recording energy representative of earlier arriving seismic waves, means for combining to a controlled extent the signal energy from at least two of said seismometers as selected from the group and for delivering the combined energy to one of said recording devices, and means for selectively varying with time the grouping of the seismometers for signal combination and the proportion of signal energy thus combined.

6. In apparatus for use in seismic surveying, the combination with a plurality of seismometers, of separate amplifying and recording devices associated therewith for separately recording energy representative of earlier arriving seismic waves, means for combining to a controlled extent the signal energy from at least two of said seismometers as selected from the group and for delivering the combined energy to one of said recording devices, means for selectively varying with time the grouping of the seismometers for signal combination and the proportion of signal energy thus combined, and means operable in response to signal energy from that seismometer which is more remote from the seismic disturbance for initiating operation of said last named means.

7. In a method of seismic surveying, the steps which include concurrently detecting seismic impulses at a plurality of spaced points, converting the impulses into electrical wave-form energy, separately recording the energy derived at each of the several points from the earlier received seismic impulses, and thereafter combining the energy derived from groups of said spaced points of progressively increasing number, and recording the energy thus combined as a continuation of the record of earlier received energy.

8. In apparatus for use in seismic surveying the combination with a plurality of seismometers, of amplifying and recording devices associated therewith, means for combining to a controlled extent the signal energy from at least two of said seismometers during the reception of a reflection from a geological bed, and means thereafter operable automatically to alter the proportion of energy derived from one seismometer to be combined with the energy from another seismometer before a reflection from a deeper bed is received whereby the extent of combination of energy from separate seismometers is varied during signal reception.

9. In a method of seismic surveying, the steps which include detecting seismic impulses at a plurality of spaced points, converting the impulses into electrical wave-form energy, combining to a controlled extent the electrical waveform energy from at least two of said points during the reception of a reflection from a geological bed, and thereafter altering the proportion of energy derived from one seismometer to be combined with the energy from another seismometer before the reception of a reflection from a deeper bed whereby the extent of combination of energy from separate seismometers is varied during signal reception.

JOSEPHUS O. PARR, Jr.